(12) United States Patent
Brown et al.

(10) Patent No.: US 12,554,822 B2
(45) Date of Patent: Feb. 17, 2026

(54) DEVICE AUTHENTICATION THROUGH PROXY

(71) Applicant: Microsoft Technology Licensing, LLC, Redmond, WA (US)

(72) Inventors: Justin David Brown, Seattle, WA (US); Luke J. Lenhart, Woodinville, WA (US); Chong He, Redmond, WA (US); Kedar Hirve, Kent, WA (US); Ankur Choudhary, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 415 days.

(21) Appl. No.: 18/088,540

(22) Filed: Dec. 24, 2022

(65) Prior Publication Data

US 2024/0211573 A1 Jun. 27, 2024

(51) Int. Cl.
*G06F 21/33* (2013.01)

(52) U.S. Cl.
CPC .................................... *G06F 21/33* (2013.01)

(58) Field of Classification Search
CPC ........ G06F 21/33; G06F 21/44; G06F 21/602; G06F 21/64
See application file for complete search history.

(56) References Cited

U.S. PATENT DOCUMENTS

| | | | |
|---|---|---|---|
| 2015/0235011 A1* | 8/2015 | Swaminathan | H04L 67/02 713/150 |
| 2015/0278506 A1* | 10/2015 | Jun | G06F 21/44 726/6 |
| 2019/0103968 A1 | 4/2019 | Srinivasan | |
| 2019/0321732 A1* | 10/2019 | Zimring | A63F 13/235 |
| 2020/0103934 A1 | 4/2020 | Steffen | |

(Continued)

FOREIGN PATENT DOCUMENTS

EP 3879784 A1 9/2021

OTHER PUBLICATIONS

International Search Report and Written Opinion received for PCT Application No. PCT/US23/081475, mailed on Mar. 6, 2024, 13 pages.

(Continued)

*Primary Examiner* — Kostas J Katsikis
(74) *Attorney, Agent, or Firm* — Rainier Patents, P.S.

(57) ABSTRACT

A software-based authentication protocol enables a client to be authenticated by a server through a host. The authentication protocol involves using mutable authentication data that changes to deter counterfeiters from making clones of authentic clients. The host requests a token from the client as proof of authenticity. The client establishes a communication channel to the server using the host as a communication proxy. The client presents mutable authentication data to the server. If the server determines that the mutable authentication data is outdated, then the client is deemed a counterfeit. If the server determined that the mutable authentication data is the latest version, then the client is deemed authentic and a token is issued to the client. Depending on a set of policies, the server changes the mutable authentication data and sends the new mutable authentication data to the client but not to counterfeit clients.

20 Claims, 5 Drawing Sheets

(56) References Cited

U.S. PATENT DOCUMENTS

2023/0418926 A1* 12/2023 Caruana ................ G06F 21/602
2024/0214202 A1*  6/2024 Choudhary ......... H04L 63/0823

OTHER PUBLICATIONS

"The Transport Layer Security (TLS) Protocol Version 1.3", IETF RFC 8446, Aug. 2018, retrieved from: https://web.archive.org/web/20221127165057/https://datatracker.ietf.org/doc/html/rfc8446, Nov. 27, 2022, 160 pages.
U.S. Appl. No. 17/848,235, filed Jun. 23, 2022, 67 pages.
International Preliminary Report on Patentability (Chapter 1) received for PCT Application No. PCT/US23/081475, mailed on Jul. 3, 2025, 8 pages.

* cited by examiner

DEVICE AUTHENTICATION THROUGH PROXY

BACKGROUND

Many electronic devices (e.g., computers, smartphones, and video game consoles) are used in conjunction with accessory devices (e.g., mice, headphones, game controllers, etc.). Therefore, accessory devices represent a large market and have become a target for counterfeiters.

SUMMARY

The concepts described herein relate to software-based authentication techniques. For example, communication protocols are described for authenticating accessory devices by an authentication service through proxy devices (e.g., host devices). The communication protocols enable verification of authentic licenses of the accessory devices while protecting against unauthorized interoperability of counterfeit accessory devices. The proxy devices can act as communication conduits through which the accessory devices and the authentication service exchange messages.

The communication protocols involve exchanging mutable authentication data. The use of mutable authentication data that changes often can combat counterfeiters from making workable cloned accessories. The present concepts may render cloned accessories inoperable to deter mass-production and sale of unauthorized accessories. The communication protocols also involve using tokens to validate authorized accessories. The tokens can be tied to specific accessory devices and/or specific host devices.

To demonstrate the implementations and operations of the authentication protocols and techniques, the present concepts will be described below in the context of authenticating game controllers (as example accessory devices) through game consoles (as example host devices). However, these concepts can have a wide range of applications in various industries to authenticate any type of device, and are not limited to authenticating controllers in the gaming field.

BRIEF DESCRIPTION OF THE DRAWINGS

The detailed description below references accompanying figures. The use of similar reference numbers in different instances in the description and the figures may indicate similar or identical items. The example figures are not necessarily to scale.

DETAILED DESCRIPTION

Overview

Figure 1:
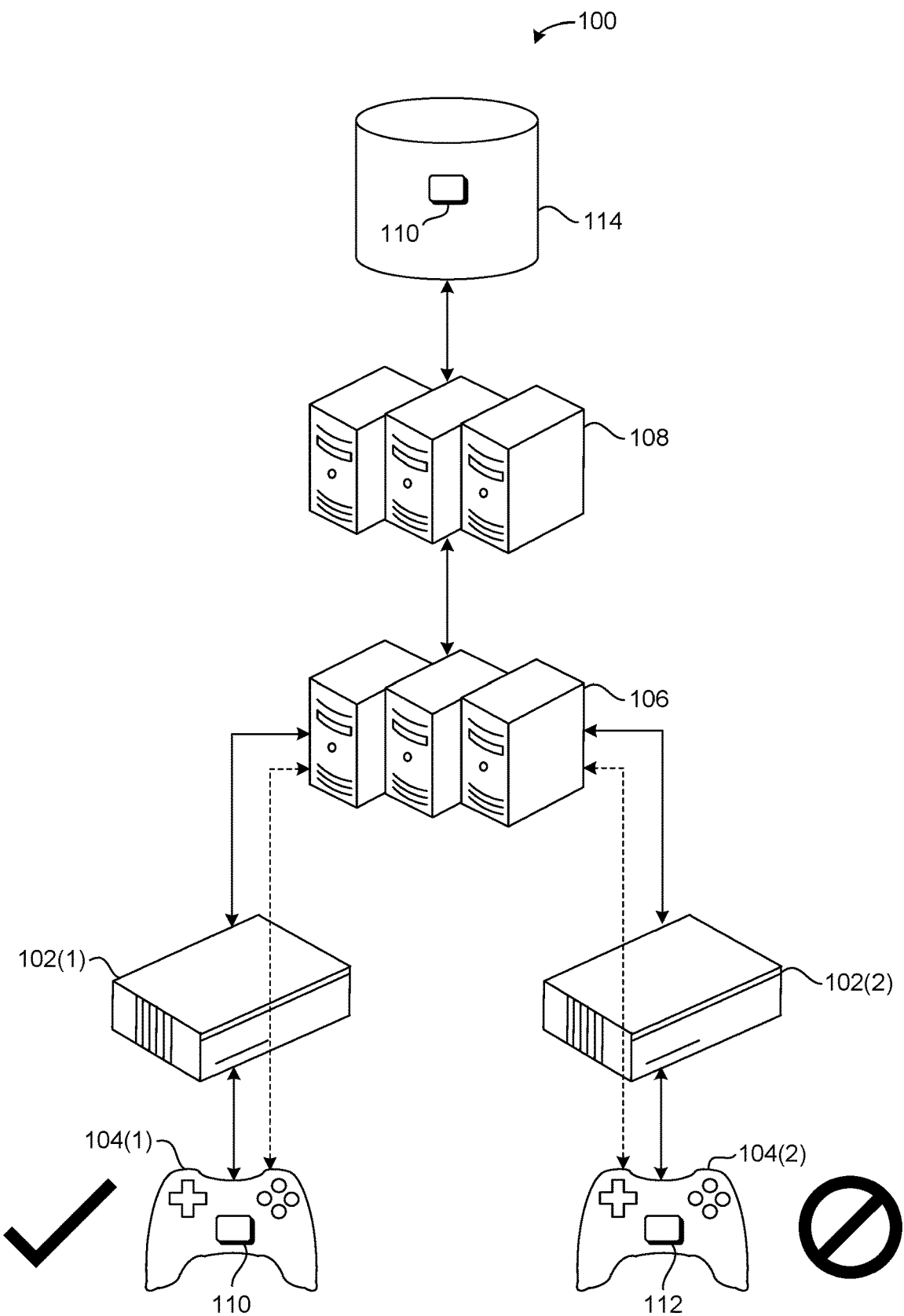
FIG. 1 illustrates an example authentication scenario in which some implementations of the present concepts may be used to authenticate devices and detect counterfeits.

FIG. 1 illustrates an example authentication scenario 100 in which some implementations of the present concepts may be used to authenticate devices and detect counterfeits. As mentioned above, the present concepts will be described in the context of detecting cloned counterfeit game controllers, but the same or similar concepts can be applied in other contexts.

The authentication scenario 100 illustrated in FIG. 1 includes one or more game consoles 102. The game consoles 102 are any electronic devices that allow users to play games using accessories. The game consoles 102 include processing capabilities and/or storage capabilities to store and run games. For example, the game consoles 102 include a personal computer (PC), a smartphone, a virtual reality headset, a television, or a typical standalone game console.

The game consoles 102 include or connect with one or more accessory devices (such as a display, a keyboard, a mouse, speakers, headphones, a storage device, a remote control, and game controllers 104) to enable users to interact with games by providing inputs and/or receiving outputs. The game consoles 102 connect to an accessory device via wire (e.g., a universal serial bus (USB) cable) or wirelessly (e.g., Wi-Fi, Bluetooth, infrared, etc.).

For example, an authentic game controller 104(1) is approved to be used with the game console 102(1) for playing games. However, a counterfeit game controller 104(2) is cloned from the authentic game controller 104(1) by a malicious actor without authorization and sold in the market. Conventional techniques are unable to distinguish between the authentic game controller 104(1) and the counterfeit game controller 104(2). Therefore, there is a need to prevent the counterfeit game controller 104(2) from working with the game console 102(2), for example, through an authentication check.

Technological Problems

One conventional authentication technique involves a game console provider selling hardware security chips to accessory vendors who make game controllers. Each security chip includes unique static authentication data, such as a unique certificate and a unique private key. A game controller manufacturer takes a license for a specific number of security chips corresponding to the number of game controllers it plans to make and sell. Then, the game controller manufacturer installs a security chip inside every game controller it manufactures. Therefore, each legitimate game controller contains unique static authentication data.

When the game controller connects to a game console, the game console sends a challenge to the security chip inside the game controller. In response, the security chip signs the challenge with the private key, and sends the signed challenge back to the game console. Then, the game console validates the signed challenge sent by the game controller using a certificate and a public key stored in the game console. Therefore, the game console can authenticate that the security chip inside the game controller was provided by the game console provider and confirm that the game controller is authentic.

However, a counterfeiter can clone the authentic game controller, without permission, to make a counterfeit game controller. For instance, a malicious actor can break the security chip, extract the private key, make a counterfeit security chip, and sell a counterfeit game controller that includes the counterfeit security chip. Therefore, when the counterfeit game controller connects to a game console, the counterfeit game controller will impersonate an authentic game controller by spoofing the same static authentication data that is stored in the authentic game controller.

One technical problem conventional authentication techniques is that the private key used to authenticate the game controller is an unchanging constant. As such, once a cloned game controller is manufactured with the same static authentication data as the authentic controller, the game console cannot distinguish between the cloned game controller and the authentic game controller, because the two are identical. Thus, there is a technical need to provide an improved authentication paradigm that can allow the game console to distinguish between an authentic game controller and a cloned counterfeit game controller.

Another technological problem associated with conventional authentication techniques is the use of hardware security chips. The security chips are susceptible to manufacturing defects and manufacturing delays (e.g., due to factory closures). A supply shortage in security chips can become a supply-chain bottleneck for manufacturing and selling new game controllers. Accordingly, there is a need to develop a software-based authentication scheme that can be implemented on generic hardware.

Technological Solutions

The present concepts relate to accessory authentication schemes that enable an end-to-end authentication between accessories and an authentication service through proxy devices. The authentication service, the accessories, and the proxies implement an authentication protocol that can validate legitimate accessories and reject counterfeits.

Referring again to the authentication scenario 100 in FIG. 1, an authentication service 106 communicates with the game consoles 102. Furthermore, the authentication service 106 can also communicate with the game controllers 104 through their respective game consoles 102 that function as communication conduits. In one implementation, the game controller 104(1) provides a command-based interface that enables the game console 102(1) to manage an authentication session and communicate with the authentication service 106.

In one implementation, the game controller 104(1) initiates communication with the authentication service 106. For example, the game controller 104(1) and the authentication service 106 can establish an encrypted communication channel (e.g., a transport security layer (TSL) connection) that tunnels through the game console 102(1) by mutually authenticating each other.

In one implementation, the game console 102(1) requests that the game controller 104(1) present a token as evidence of its authenticity. The game controller 104(1) uses the encrypted communication channel to request a token from the authentication service 106 by presenting mutable authentication data (e.g., controller authentication data (CAD) 110) to the authentication service 106. In turn, the authentication service 106 checks with a policy service 108 to determine whether the CAD 110 presented by the game controller 104(1) is valid. The policy service 108 can be implemented on the same or different server hardware as the authentication service 106.

The policy service 108 maintains an authentication database 114 that stores CADs associated with multiple game controllers, including the CAD 110 associated with the game controller 104(1). The policy service 108 checks that the CAD 110 that was provided by the game controller 104(1) matches the CAD 110 stored in the authentication database 114. If the policy service 108 validates the CAD 110 from the game controller 104(1), then the authentication service 106 issues the token to the game controller 104(1). In turn, the game controller 104(1) presents the token to the game console 102(1) as proof of being authenticated and to be allowed to interoperate with the game console 102(1).

Consistent with the present concepts, the policy service 108 stores a set of policies that determine the circumstances under which to change the CAD 110 stored in the authentication database 114 and issue the changed CAD 110 to the game controller 104(1) to store and present during a future authentication session. If the counterfeit game controller 104(2) duplicates an old CAD 112 and tries to authenticate by presenting the old CAD 112, then the policy service 108 rejects the counterfeit game controller 104(2), because the old CAD 112 does not match the changed CAD 110 in the authentication database 114. Accordingly, the game console 102(2) limits the operability of the counterfeit game controller 104(2).

The policy service 108 can mutate (e.g., change, update, replace, overwrite, or reset) the CAD 110 periodically (e.g., daily, weekly, etc.) and/or upon certain events (e.g., every time the game controller 104(1) connects to the game console 102(1)), such that the authentic game controller 104(1) that stores and presents the latest CAD 110 will be successfully authenticated, whereas the counterfeit game controller 104(2) that stores and presents the old CAD 112 will fail the authentication check. Accordingly, the present concepts can combat counterfeiters by rendering their cloned accessories unusable, because the mutable authentication data changes. Various implementations of the present concepts involving the mutable authentication data and the policies, as well as technical advantages, are described in U.S. patent application Ser. No. 17/848,235, entitled "Authentication Using Mutable Data," filed on Jun. 23, 2022, the entirety of which is incorporated by reference herein.

System Devices

Figure 2:
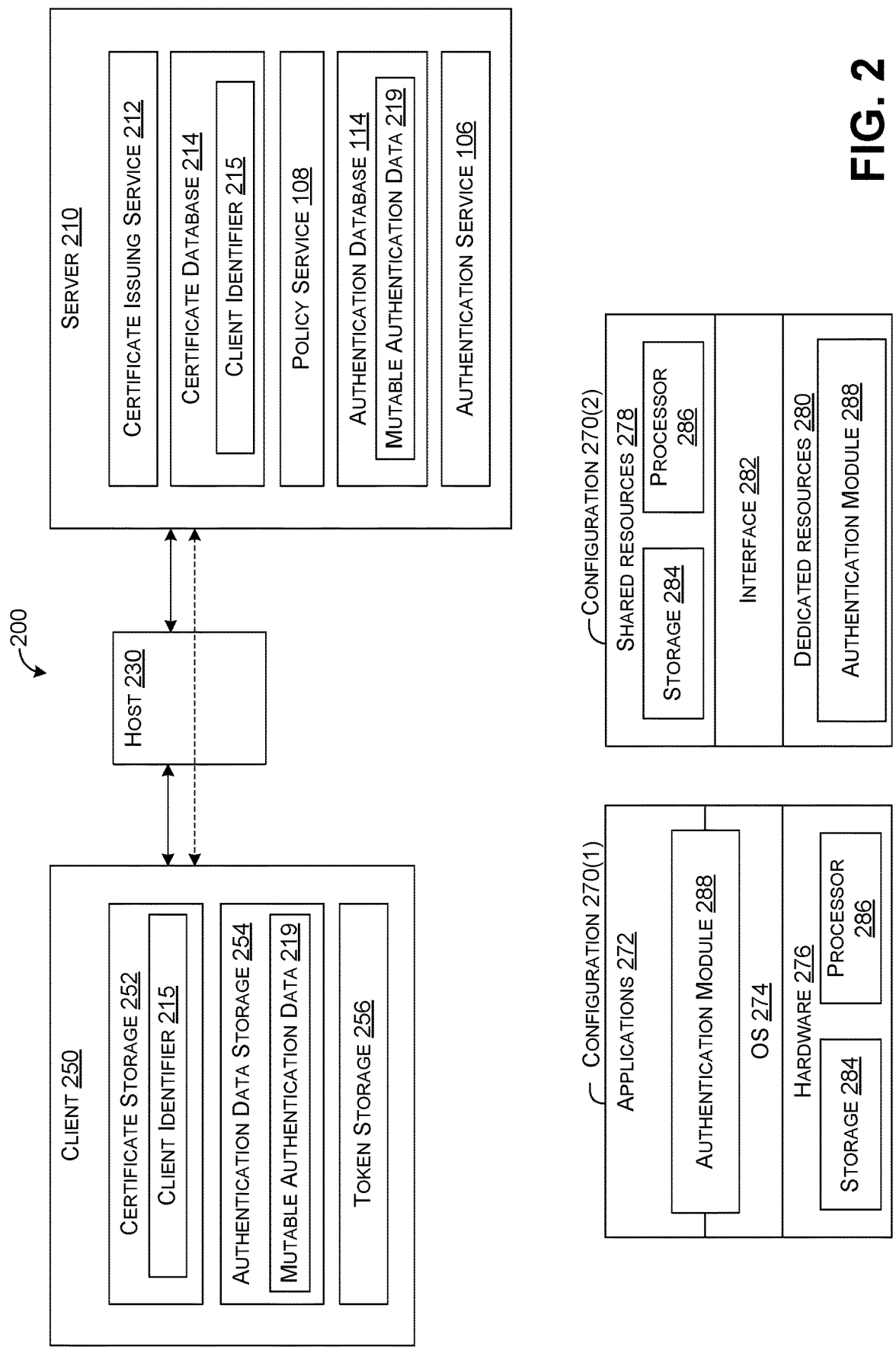
FIG. 2 illustrates an example system, consistent with some implementations of the present concepts.

FIG. 2 illustrates an example system 200, consistent with some implementations of the present concepts. The system 200 includes a server 210, a host 230, and a client 250. Although FIG. 2 illustrates only one server 210, one host 230, and one client 250 for simplicity of explaining the present concepts, the system 200 can include multiple servers 210, multiple hosts 230, and/or multiple clients 250.

The server 210 can be implemented in one or more server computers that have processing capabilities and storage capacity. The server 210 includes a certificate issuing service 212 that generates and issues a unique certificate containing a unique client identifier 215 to be stored in the client 250. In one example implementation, the certificate is globally unique and is formatted using a public key certificate standard, such as the X.509 standard. The certificate can be signed. For example, the provider of the host 230 can sign the certificate using its private key. In some scenarios, an accessory intermediate certification authority ("CA") can sign the certificate using its private key. The server 210 includes a certificate database 214 for storing multiple client identifiers associated with multiple clients. For instance, the certificate database 214 stores the client identifier 215 associated with the client 250.

The server 210 includes the policy service 108. The policy service 108 stores policies related to authentication. Based on the policies, the policy service 108 makes decisions on whether to authenticate or reject the client 250, and decisions on whether to generate and/or change mutable authentication data 219 (such as the CAD 110 in FIG. 1). The policy service 108 generates and issues the mutable authentication data 219 to the client 250. The policy service 108 also checks the mutable authentication data 219 presented by the client 250 to authorize or reject the client 250 for use with the host 230.

For example, the mutable authentication data 219 can include a randomly or arbitrarily generated number and/or string, such as a nonce. Alternatively or additionally, the mutable authentication data 219 can include a timestamp, a serial number, and/or a signature. In the example context where the client 250 is the game controller 104(1), the mutable authentication data 219 includes the CAD 110. The mutable authentication data 219 can have a fixed size (e.g., 1 kilobyte or 4 kilobytes) or have varying sizes. In one implementation, the mutable authentication data 219 is formatted and stored as a binary large object (blob). The mutable authentication data 219 can be opaque to the client 250 and the host 230. That is, the client 250 and the host 230 do not read or interpret the mutable authentication data 219. The client 250 and the host 230 can simply receive, store, present, and/or relay the mutable authentication data 219.

The server 210 includes an authentication database 114 for storing the mutable authentication data 219 generated and issued by the policy service 108. In one implementation, the mutable authentication data 219 is stored in association with the client identifier 215 of the client 250 to which the mutable authentication data 219 was issued. Accordingly, the policy service 108 knows multiple client identifiers of multiple clients as well as their assigned mutable authentication data in order to run authentication checks.

Consistent with some implementations of the present concepts, the policy service 108 authenticates the client 250 if the client 250 provides the correct mutable authentication data 219 that was last issued by the policy service 108 to the client 250. For example, the policy service 108 issues new mutable authentication data 219 to the client 250 to be stored and then presented for future authentication checks. Depending on the policies, the mutable authentication data 219 can be updated periodically (e.g., hourly, daily, weekly, monthly, etc.) and/or upon specific events (e.g., at every authentication check, a time period expiring, the client 250 connecting to another host, etc.). In one implementation, the expiration period of the mutable authentication data 219 is set by policies. Such policies maintained by the policy service 216 can be adjusted. If the client 250 presents outdated authentication data (such as the old CAD 112 in FIG. 1), then the policy service 108 denies the request to authenticate the client 250.

In some implementations, the policy service 108 stores more than one mutable authentication data in association with each client identifier 215 in the authentication database 114. For example, the authentication database 114 can store the two most recent mutable authentication data for each client identifier 215 in a first-in, first-out fashion. As such, even if the client 250 presents the second most recent mutable authentication data rather than the latest mutable authentication data, the policy service 108 authenticates the client 250. This setup allows the policy service 108 to be resilient to possible errors and/or failures that occur while the client 250 is receiving the updated mutable authentication data 219 over a network and/or writing the updated mutable authentication data 219 to an authentication data storage 254. Alternatively, three or higher numbers of the most recent mutable authentication data 219 can be stored in association with each client identifier 215 in the authentication database 114, and the client 250 can present any one of the multiple stored mutable authentication data 219 to be authenticated.

The server 210 includes the authentication service 106. The authentication service 106 generates and issues the token to the client 250 in response to the policy service 108 validating the mutable authentication data 219 presented by the client 250. The token can be signed by the authentication service 106 before being sent to the client 250. The token can be associated with the host 230 specifically in addition to being specifically assigned to the client 250, such that the token can be used by the client 250 to interoperate with the host 230 but not with other hosts. The authentication service 106 can also check and validate the token to confirm that the token was issued by the authentication service 106. For instance, the authentication service 106 can check and confirm that the token was signed by the authentication server 106.

Although FIG. 2 illustrates the certificate issuing service 212, the certificate database 214, the policy service 108, the authentication database 114, and the authentication service 106 as being included in the server 210, alternative configurations are possible. For example, the certificate issuing service 212, the certificate database 214, the policy service 108, the authentication database 114, and the authentication service 106 can be included in different servers (as illustrated in FIG. 1) and/or included in different storage devices. In other implementations, the certificate database 214 and/or the authentication database 114 can be remote from the server 210.

The client 250 can be any device, accessory, or article that can be authenticated. For example, the client 250 can include the authentic game controller 104(1), a display, a keyboard, a mouse, speakers, headphones, a hard drive, a removable storage, a card, a key, a badge, a remote control, glasses, headgear, etc. Although FIG. 2 illustrates the client 250 as a hardware device, the client 250 can be a software module that can execute an authentication protocol.

In some implementations, all or some functions of the client 250 (such as the ability to function with the host 230) are restricted unless or until the client 250 is authenticated by the policy service 108. The host 230 can include enforcement policies that determine which features of the client 250 are enabled or disabled depending on whether the client 250 is able to be authenticated. In one implementation, the client 250 includes a certificate storage 252 for storing a certificate that includes the client identifier 215. The client 250 also includes the authentication data storage 254 for storing the mutable authentication data 219.

The certificate stored in the certificate storage 252 of the client 250 is issued by the certificate issuing service 212 of the server 210. In some implementations, the certificate is stored in the client 250 at the time of manufacturing the client 250, and the certificate does not change.

The mutable authentication data 219 stored in the authentication data storage 254 of the client 250 is issued by the policy service 108 of the server 210. In one implementation, whenever the policy service 108 issues the client 250 new mutable authentication data 219, the client 250 writes the new mutable authentication data 219 to the authentication data storage 254, so that the mutable authentication data 219 stored in the client 250 and the server 210 can be synchronized. In one implementation, when the new mutable authentication data 219 is written on the client 250, any old mutable authentication data is replaced (e.g., deleted, discarded, overwritten, etc.). In some implementations, the client 250 stores two or more mutable authentication data 219 in the authentication data storage 254. For example, the authentication data storage 254 has two slots that can store the two most recent mutable authentication data 219 that the client 250 received from the server 210, for example, in a first-in, first-out basis. As such, the client 250 can present both of the stored mutable authentication data 219 to the server 210, and the policy service 108 authenticates the client 250 based on any one of the two presented mutable authentication data 219 that matches one or more of the latest mutable authentication data 219 stored in the authentication database 114 of the server 210.

These implementations of storing multiple mutable authentication data 219 provide resiliency and robustness against possible errors and/or failures that can occur while the client 250 is receiving the updated mutable authentication data 219 over a network, writing the updated mutable authentication data 219 in memory, and/or data corruption after the mutable authentication data 219 has been stored. For example, the client 250 could erroneously disconnect from a network and lose its connection to the server 210, the client 250 could experience an error while writing the latest mutable authentication data 219 to the authentication data storage 254, or the client 250 could unexpectedly lose power. Furthermore, flash storage data corruption could render the mutable authentication data 219 stored in the client 250 unusable for authentication. These and any other errors could prevent the client 250 from successfully being authenticated, for example, during the next authentication session. By storing multiple mutable authentication data 219, the client 250 is more resilient to errors and is still able to pass future authentication checks.

In one implementation, the client 250 is manufactured without any mutable authentication data 219. The client 250 is issued its first mutable authentication data 219 by the policy service 108 at the first time the client 250 attempts to be authenticated. If a counterfeiter is able to extract the mutable authentication data 219 to make multiple clones (e.g., the counterfeit game controller 104(2)), then those clones will not be able to authenticate with the policy service 108, because the mutable authentication data 219 would have changed by the time the clones try to authenticate using the old mutable authentication data (e.g., the old CAD 112).

The client 250 also includes a token storage 256 for storing the token received from the authentication service 106 of the server 210 upon a successful authentication check. The client 250 can present the token from the token storage 256 to the host 230 as proof of successful authentication.

The host 230 can include any computer, device, apparatus, machine, or accessory that can operate with the client 250. For example, the host 230 can include the game console 102(1), PC, a television, a tablet, a smartphone, etc. Although FIG. 2 illustrates the host 230 as a hardware device, the host 230 can be a software module (e.g., an application, program, operating system, firmware, etc.) that authenticates the client 250.

Consistent with some implementations of the present concepts, the host 230 attempts to authenticate the client 250 by using the policy service 108 of the server 210. For example, the host 230 requests the token from the client 250 as proof of successful authentication.

In some implementations, the host 230 facilitates communications between the client 250 and the server 210 for the purpose of performing authentication checks. That is, the host 230 acts as a proxy or an intermediary that supports a communication channel between the client 250 and the server 210.

Depending on whether the authentication attempt by the client 250 succeeds or fails, the host 230 can enforce one or more enforcement policies depending on the authentication result, for example, by enabling or disabling certain features of the client 250. That is, the host 230 has the capability to operate the client 250 in one or more operational modes.

Each of the server 210, the host 230, and the client 250 can include personal computers, desktop computers, server computers, notebook computers, cellular phones, smartphones, personal digital assistants, tablets or pad type computers, mobile computers, cameras, appliances, virtual reality headsets, video game consoles, controllers, smart devices, IoT devices, vehicles, watches, wearables, set-top boxes, game systems, automobile entertainment or navigation consoles, coffee makers, etc., and/or any of a myriad of ever-evolving or yet to be developed types of electronic devices. The number of the devices and the client-versus-server side of the devices described and depicted are intended to be illustrative and non-limiting.

The server 210, the host 230, and the client 250 can communicate with one another via wire (e.g., USB, ethernet, etc.), wirelessly (e.g., Wi-Fi, Bluetooth, infrared, near-field communication, etc.), and/or via one or more networks including the Internet. For example, the server 210, the host 230, and/or the client 250 include communication modules, such as wireless radio chips, that can communicate using one or more communication protocols.

The term "device," "computer," or "computing device" as used herein can mean any type of device that has some amount of processing capability and/or storage capability. Processing capability can be provided by one or more hardware processors that can execute data in the form of computer-readable instructions to provide a functionality. Data, such as computer-readable instructions and/or user-related data, can be written on storage, such as storage that can be internal or external to the device. The storage can include any one or more of volatile or non-volatile memory, hard drives, flash storage devices, optical storage devices (e.g., CDs, DVDs etc.), and/or remote storage (e.g., USB drives or cloud-based storage), among others. As used herein, the term "computer-readable medium" can include transitory propagating signals or carrier waves. In contrast, the term "computer-readable storage medium" excludes transitory propagating signals and carrier waves. Computer-readable storage media can include computer-readable storage devices. Examples of computer-readable storage devices include volatile storage media, such as RAM, and non-volatile storage media, such as hard drives, optical discs, and flash memory, among others.

FIG. 2 shows two example device configurations 270 that can be employed by any or all of the server 210, the host 230, and the client 250. The first configuration 270(1) represents an operating system (OS) centric configuration. The second configuration 270(2) represents a system on a chip (SoC) configuration. The first configuration 270(1) can be organized into one or more applications 272, an operating system 274, and hardware 276. The second configuration 270(2) can be organized into shared resources 278, dedicated resources 280, and an interface 282 therebetween.

Either configuration 270 can include a storage 284 and a processor 286. For example, the storage 284 in the server 210 includes the certificate database 214 and/or the authentication database 114, and the storage 284 in the client 250 includes the certificate storage 252 and/or the authentication data storage 254.

The configurations 270 also include an authentication module 288 for implementing the communication protocols described herein. For instance, the authentication module 288 in the server 210 implements the certificate issuing service 212, the policy service 108, and the authentication service 106. The authentication module 288 in the host 230 enables a passthrough communication channel and relays messages between the client 250 and the server 210, initiates an authentication check, requests that the client 250 present the token as proof of authenticity, confirms the validity of the token with the server 210, and enforces authentication results by placing the client 250 into one or more operational modes. The authentication module 288 in the client 250 stores the mutable authentication data 219 received from the server 210, presents the mutable authentication data 219 to the server 210 for authentication, and presents the token to the host 230.

As mentioned above, the second configuration 270(2) includes an SoC type design, which can be integrated on a single SoC or multiple coupled SoCs. One or more processors 286 can be configured to coordinate with shared resources 278, such as storage 284, etc., and/or one or more dedicated resources 280, such as hardware blocks configured to perform certain specific functionality. Thus, the term "processor" as used herein can also refer to central processing units (CPUs), graphical processing units (GPUs), controllers, microcontrollers, processor cores, or other types of processing devices and integrated circuits.

Generally, any of the functions described herein can be implemented using software, firmware, hardware (e.g., fixed-logic circuitry), or a combination of these implementations. The term "component" or "module" as used herein generally represents software, firmware, hardware, whole devices or networks, or a combination thereof. In the case of a software implementation, for instance, these terms represent program code that performs specified tasks when executed on a processor (e.g., CPU or CPUs). The program code can be stored in one or more computer-readable memory devices, such as computer-readable storage media. The features and techniques of the component or module can be platform-independent, meaning that they can be implemented on a variety of commercial computing platforms having a variety of processing configurations.

The system 200 illustrated in FIG. 2 is merely one example. The system 200 need not include all of the example elements described in connection with FIG. 2. The system 200 can also include additional elements not explicitly described in connection with FIG. 2.

Communications

Figure 3:
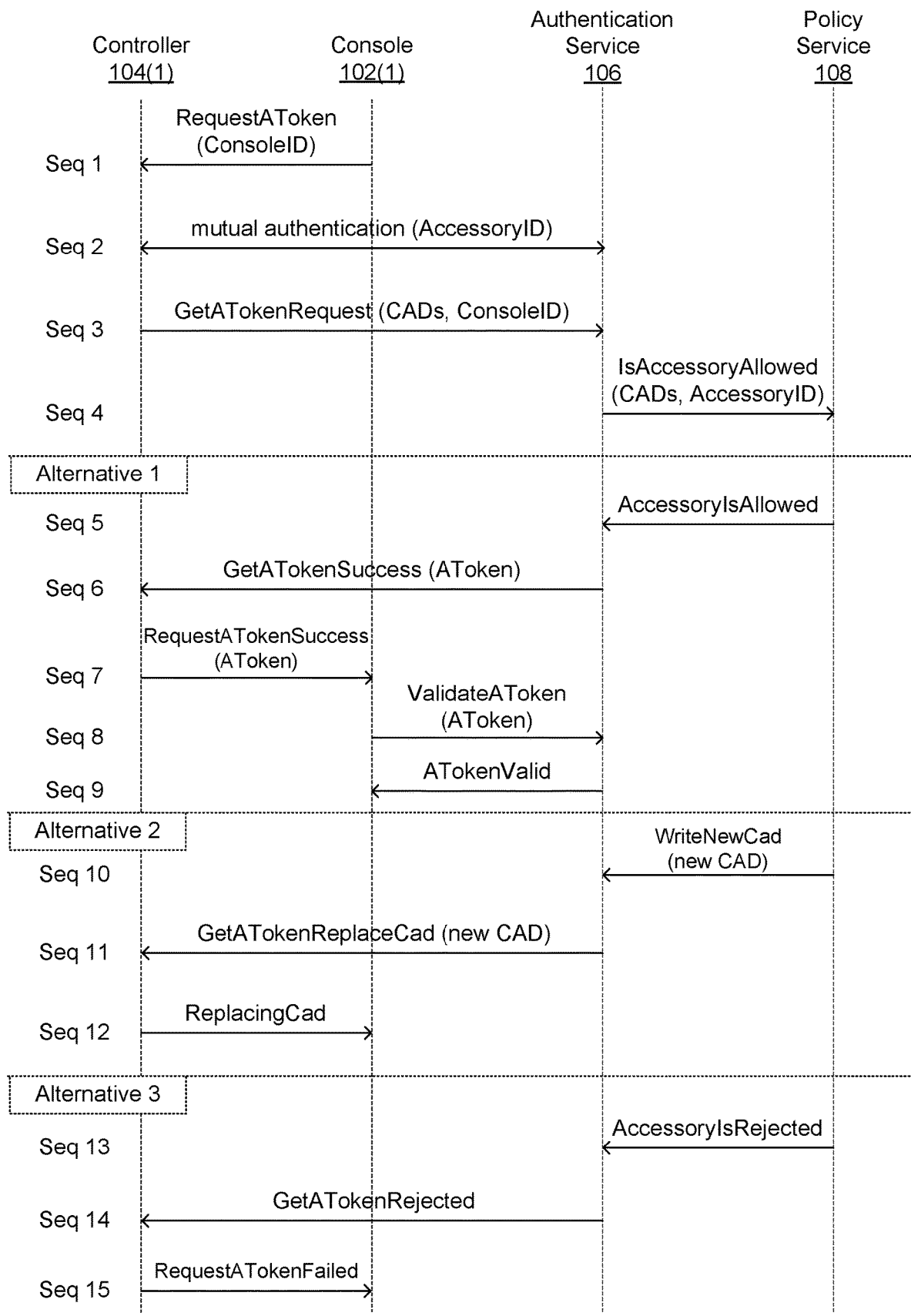
FIG. 3 illustrates example communications, consistent with some implementations of the present concepts.

FIG. 3 illustrates example communications, consistent with some implementations of the present concepts. In connection with FIG. 3, example sequences of communication (e.g., messages exchanged) among the controller 104(1), the console 102(1), the authentication service 106, and the policy service 108 in performing authentication checks will be described. In these examples, the controller 104(1) is an example of the client 250 that is being authenticated to prevent counterfeits, and the console 102(1) is an example of the host 230 that acts as a communication proxy. However, the same or similar communications can be conducted by other types of clients and hosts. The names of the messages and the names of the payloads inside the messages that are described below are examples. Other names can be used and serve the same purposes or functions. Any of the communications described can be sent and received using or involving any communication techniques or protocols, such as representational state transfer (REST), transport layer security (TLS), JavaScript object notation (JSON), etc.

Even before Sequence 1, if a user powers on the controller 104(1) and connects it to the console 102(1) via wire or wirelessly, then the controller 104(1) and the console 102(1) initiate communication with each other. For example, the controller 104(1) and the console 102(1) can perform handshakes and/or any authentication using their certificates.

In Sequence 1, the console 102(1) requests the token from the controller 104(1). Sequence 1 can be initiated when the console 102(1) determines that it wants to validate the controller 104(1) (e.g., that the controller 104(1) has a valid license), because a certain event triggered the console 102(1) to test the authenticity of the controller 104(1). For example, the console 102(1) powering on, the controller 104(1) powering on, the controller 104(1) connecting to the console 102(1), the user initiating a certain function of the console 102(1) (e.g., by starting a game), or any other event can cause the console 102(1) to ask the controller 104(1) to present a valid token.

In one implementation the token is an accessory token ("AToken") that validates the authenticity of an accessory device. For example, the console 102(1) requests that the controller 104(1) provide a valid AToken by sending a RequestAToken message to the controller 104(1). The RequestAToken message can include a payload (e.g., variables, parameters, settings, flags, etc.). For example, the RequestAToken message includes a ConsoleID, which is the identifier of the console 102(1). The RequestAToken message can also include the identity (e.g., hostname, address, etc.) of the authentication service 106.

In some scenarios, the controller 104(1) has the AToken received and cached from a prior authentication session, and the controller 104(1) can simply return the cached AToken to the console 102(1) (e.g., Sequence 7). If the controller 104(1) does not have the AToken (or the cached AToken has expired, is invalid, or is not accepted by the console 102(1)), then the controller 104(1) requests the AToken from the authentication service 106.

In Sequence 2, the controller 104(1) and the authentication service 106 perform mutual authentication and establish a communication channel. Sequence 2 represents multiple messages exchanged between the controller 104(1) and the authentication service 106 through the console 102(1) acting as a communication proxy.

In actuality, the controller 104(1) exchanges messages with the console 102(1), and the console 102(1) exchanges messages with the authentication service 106. However, because the console 102(1) relays the messages between the controller 104(1) and the authentication service 106, the controller 104(1) and the authentication service 106 can be logically considered to be exchanging messages with each other. The messages exchanged between the controller 104(1) and the authentication service 106 can be opaque to the console 102(1). The console 102(1) can merely forward (or pass along) the messages. For example, the controller 104(1) and the authentication service 106 can send a SetPassThroughData message to the console 102(1). The payload of the SetPassThroughData message can be the substantive message intended for the ultimate recipient to whom the console 102(1) will pass long the substantive message.

In one implementation, the controller 104(1) and the authentication service 106 use the TLS protocol to establish an encrypted communication channel. As explained above, the controller 104(1) can initiate a communication session with the authentication service 106 through the console 102(1). For example, the controller 104(1) and the authentication service 106 exchange a server certificate and a client certificate including an AccessoryID. The AccessoryID is a unique accessory identity associated with the controller 104(1), such as the client identifier 215. After Sequence 2 establishes an encrypted communication channel, messages between the controller 104(1) and the authentication service 106 are sent through the communication channel (i.e., through the console 102(1)).

In Sequence 3, the controller 104(1) requests the AToken from the authentication service 106 using the communication channel. For example, the controller 104(1) sends a GetATokenRequest message to the authentication service 106. In one implementation, the GetATokenRequest message includes one CAD blob (e.g., the CAD 110 in FIG. 1). In another implementation, the GetATokenRequest message includes two CAD blobs. In the scenario where the controller 104(1) is requesting authentication for the first time and has not previously been issued a CAD blob, the GetATokenRequest message includes a meaningless CAD blob. The GetATokenRequest message can also include the ConsoleID that the console 102(1) sent to the controller 104(1) in Sequence 1.

In Sequence 4, the authentication service 106 checks with the policy service 108 to authenticate the controller 104(1). For example, the authentication service 106 sends an IsAccessoryAllowed message to the policy service 108. In one implementation, the IsAccessoryAllowed message includes the AccessoryID that the authentication service 106 obtained from the controller 104(1) during the mutual authentication in Sequence 2. The IsAccessoryAllowed message can also include one or more CAD blobs that were included in the GetATokenRequest message in Sequence 3.

Consistent with the present concepts, the policy service 108 maintains an authentication database 114 of AccessoryIDs and associated CAD blobs. Accordingly, upon receipt of the IsAccessoryAllowed message, the policy service 108 checks the authentication database 114 to determine whether to allow or reject the controller 104(1). The policy service 108 also stores a set of policies to determine authentication outcomes.

Several possible alternative outcomes are possible. If the one or more CAD blobs and the AccessoryID in the IsAccessoryAllowed message do not match the CAD blobs and the AccessoryID in the authentication database 114, then the policy service 108 rejects the controller 104(1) as a counterfeit (Alternative 3 in FIG. 3). If the one or more CAD blobs and the AccessoryID in the IsAccessoryAllowed message match the CAD blobs and the AccessoryID in the authentication database 114, then the policy service 108 allows the controller 104(1).

Where the controller 104(1) is allowed, the policy service 108 further checks the policies to determine whether a new CAD blob should be generated and issued to the controller 104(1). For example, the policies can be set to issue a new CAD blob every time the controller 104(1) attempts authentication or after the expiration of a certain time period (e.g., 24 hours, one week, etc.) since the last successful authentication. Additionally or alternatively, the policies can require updating the CAD blob if the controller 104(1) connects to a different console. If the policies determine that the CAD blob should be updated, then the policy service 108 issues a new CAD blob to the controller 104(1) (Alternative 2 in FIG. 3). Otherwise, the policy service 108 simply authenticates the controller 104(1) without updating the CAD blob (Alternative 1 in FIG. 3).

Furthermore, in the scenario where the controller 104(1) is attempting authentication for the first time, the policy service 108 can check the authentication database 114 to confirm that the AccessoryID provided with the IsAccessoryAllowed message does not exist in the authentication database 114 of the policy service 108. After confirming that the authentication attempt is the first for the controller 104(1) or that the controller 104(1) has not previously been issued a CAD blob, the policy service 108 generates and issues a new CAD blob to the controller 104(1) (Alternative 2 in FIG. 2).

In FIG. 3, after Sequences 1-4, there are three alternative sequences of communications that are possible. Alternative 1 includes Sequences 5-9, Alternative 2 includes Sequences 10-12, and Alternative 3 includes Sequences 13-15. These Alternatives will be explained below.

In Alternative 1, the policy service 108 has determined that the controller 104(1) has presented an up-to-date CAD blob that is in synchronization with the CAD blob stored in the authentication database 114 and has determined that the CAD blob in the controller 104(1) does not need to be updated. Accordingly, in Sequence 5, the policy service 108 sends an AccessoryIsAllowed message to the authentication service 106. The AccessoryIsAllowed message in Sequence 5 is one of the possible responses to the IsAccessoryAllowed message in Sequence 4.

In response, the authentication service 106 generated the AToken as evidence that the controller 104(1) has successfully passed the authentication check. In one implementation, the AToken is a JSON web token (JWT) and is signed by a private key of the authentication service 106. In some implementations, the AToken is generated based on certain information (e.g., in fields), for example, the AccessoryID of the controller 104(1), the time when the AToken was issued, the time when the AToken will expire, the ConsoleID of the console 102(1), and/or the time when the CAD blob was issued. Where the AToken includes the ConsoleID of the console 102(1), the AToken authorizes the controller 104(1) to be used with that particular console 102(1). Therefore, if a counterfeiter copies the AToken and tries to use the copied AToken in an attempt to have the counterfeit controller 104(2) interoperate with another console 102(2), then the attempt will fail. In one implementation, the AToken is opaque to the console 102(1) and the controller 104(1) such that they cannot view the contents of the AToken. Other techniques, besides the AToken described herein, are possible for the authentication service 106 to communicate to the console 102(1) that the controller 104(1) is successfully authenticated.

In Sequence 6, the authentication service 106 provides the AToken to the controller 104(1) as proof of successful authentication. For example, the authentication service 106 sends a GetATokenSuccess message that includes the AToken as payload to the controller 104(1). The GetATokenSuccess message in Sequence 6 is one of the possible responses to the GetATokenRequest message in Sequence 3.

In Sequence 7, the controller 104(1) presents the AToken, which it received from the authentication service 106, to the console 102(1) as proof of successful authentication. For example, the controller 104(1) sends a RequestATokenSuccess message to the console 102(1). The RequestATokenSuccess message includes the AToken that was inside the GetATokenSuccess message in Sequence 6. The RequestATokenSuccess message in Sequence 7 is one of the possible responses to the RequestAToken message in Sequence 1.

Upon receiving the AToken, the console 102(1) confirms that the controller 104(1) is authentic by requesting that the authentication service 106 validate the AToken, for example, using an API service provided by the authentication service 106. In Sequence 8, the console 102(1) sends a ValidateAToken message to the authentication service 106. The ValidateAToken message includes the AToken that the console 102(1) received from the controller 104(1) inside the RequestATokenSuccess message in Sequence 7.

Upon receiving the ValidateAToken message, the authentication service 106 confirms that the AToken in the ValidateAToken message was indeed issued by the authentication service 106. In one implementation, the authentication service 106 checks the signature of the AToken to confirm that the AToken was correctly signed by and indeed issued by the authentication service 106. This implementation does not require the authentication service 106 to maintain a database of ATokens.

Upon confirming that the AToken is valid, in Sequence 9, the authentication service 106 informs the console 102(1) that the AToken is valid. For example, the authentication service 106 sends an ATokenValid message to the console 102(1). The ATokenValid message in Sequence 9 is one of the possible responses to the ValidateAToken message in Sequence 8. However, if the authentication service 106 determines that the AToken is invalid, then the authentication service 106 sends an ATokenInvalid message to the console 102(1).

Depending on whether the console 102(1) receives the ATokenValid message or the ATokenInvalid message from the authentication service 106, the console 102(1) accepts the controller 104(1) as authentic or rejects the controller 104(1) as a counterfeit. The console 102(1) includes enforcement policies that determine the consequences of passing or failing the authentication check. For example, the controller 104(1) can be completely disabled, enabled to operate in a restricted mode with limited functionalities, or permitted to fully operate with all functionalities enabled. The completion of Sequence 9 can end a successful authentication session. In addition to using the AToken to confirm the authenticity of the controller 104(1) to the console 102(1), the same AToken can be used to prove the authenticity of the controller 104(1) to other devices or services.

In Alternative 2, the policy service 108 has determined that the controller 104(1) has presented an up-to-date CAD blob that is in synchronization with the CAD blob stored in the authentication database 114 and determined that the CAD blob in the controller 104(1) is to be updated. Alternatively, the policy service 108 has determined that the controller 104(1) has not been issued any CAD blob previously (e.g., the controller 104(1) is attempting to authenticate for the first time). The policy service 108 generates a new CAD blob and associates it with the AccessoryID in the authentication database 114. Where the authentication database 114 already includes one or more existing CAD blobs associated with the AccessoryID, the policy service 108 replaces the existing CAD blob (or one of the existing CAD blobs) with the new CAD blob. Where the AccessoryID does not exist in the authentication database 114, the policy service 108 adds the Controller ID along with the new CAD blob to the authentication database 114.

The policy service 108 persistently stores the new CAD blob until the new CAD blob is replaced with yet a newer CAD blob. Therefore, the next time the policy service 108 receives an authentication request from the controller 104(1) that presents the correct latest CAD blob, the policy service 108 is assured that the controller 104(1) is the same physical device to which the latest CAD blob was previously issued.

In one implementation, the policy service 108 stores one CAD blob per AccessoryID. Thus, storing the new CAD blob overwrites any old CAD blob already stored in the authentication database 114. Alternatively, the policy service 108 stores multiple CAD blobs per AccessoryID, for example, two, three, or any number of the most recently generated CAD blobs in association with the AccessoryID of the controller 104(1). Storing mutable CAD blobs provides resiliency against any potential errors that occur while the controller 104(1) receives and/or writes CAD blobs.

In Sequence 10, the policy service 108 sends a WriteNewCad message to the authentication service 106. The WriteNewCad message includes the new CAD blob. Where the controller 104(1) includes multiple slots for storing multiple CAD blobs, the WriteNewCad message includes a SlotNumber, which can be a numerical value (e.g., 0, 1, 2, 3, etc.) that indicates the slot number into which the new CAD blob should be written. The WriteNewCad message in Sequence 10 is one of the possible responses to the IsAccessoryAllowed message in Sequence 4.

Upon receiving the new CAD blob from the policy service 108, the authentication service 106 forwards the new CAD blob to the controller 104(1). For example, the authentication service 106 sends a GetATokenReplaceCad message to the controller 104(1). The GetATokenReplaceCad message in Sequence 11 includes the new CAD blob that was inside the WriteNewCad message in Sequence 10. Where the controller 104(1) has multiple slots for storing multiple CAD blobs, the GetATokenReplaceCad message includes the SlotNumber that was included in the WriteNewCad message in Sequence 10. The GetATokenReplaceCad message in Sequence 11 is one of the possible responses to the GetATokenRequest message in Sequence 3.

The controller 104(1) receives the GetATokenReplaceCad message and stores the new CAD blob in memory. Where the GetATokenReplaceCad message includes the SlotNumber, the controller 104(1) stores the new CAD blob in the slot indicated by the SlotNumber. If the controller 104(1) is receiving the new CAD blob for the first time, then the controller 104(1) simply stores the new CAD blob in memory. Otherwise, storing the new CAD blob replaces an existing CAD blob already stored in the controller 104(1). The existing CAD blob is outdated, i.e., out-of-sync with the new CAD blob stored in the authentication database 114 of the policy service 108, and therefore can no longer be used to successfully authenticate the controller 104(1) in the future. Instead, the new CAD blob is up-to-date (i.e., in-sync with the CAD blob stored in the authentication database 114 of the policy service 108) and therefore can be used to successfully authenticate the controller 104(1) going forward.

Optionally, in Sequence 12, the controller 104(1) informs the console 102(1) that a CAD blob is being replaced. For example, the controller 104(1) sends a ReplacingCad message to the console 102(1). The ReplacingCad message in Sequence 12 is one of the possible responses to the RequestAToken message in Sequence 1. The ReplacingCad message in Sequence 12 is an optional message that need not be sent.

After Alternative 2 (i.e., after Sequence 11 and/or Sequence 12), the controller 104(1) repeats Sequence 3 and sends another GetATokenRequest message that includes the new CAD blob to the authentication service 106. Sequence 3 can be repeated by continuing to use the same communication channel established in the previous iteration of Sequence 2, or another iteration of Sequence 2 can be performed to establish a new communication channel for use with the repeat iteration of Sequence 3. Then, Sequences 4-9 will also repeat. This repetition of Sequences 3-4, where the controller 104(1) returns the new CAD blob to the policy service 108 that had issued the new CAD blob to the controller 104(1), ensures that the new CAD blob was successfully transmitted from the policy service 108 to the controller 104(1) and was successfully written and durably committed to memory in the controller 104(1). Rather than having a separate dedicated acknowledgment message from the controller 104(1) to the policy service 108 to confirm successful receipt and write of the new CAD blob, the repeat GetATokenRequest that includes the new CAD blob can serve as the acknowledgement.

The next time the controller 104(1) is powered up or connects to the console 102(1) the above described communications can be repeated. For example, Sequences 1-9 (or Sequences 1-4, 10-12, and 3-9) can be performed to successfully authenticate the controller 104(1) because the CAD blob that the controller 104(1) provides in Sequence 3 would be the latest CAD blob that matches the CAD blob in the authentication database 114 of the policy service 108. Furthermore, in Sequence 10, the policy service 108 issues a newer CAD blob to the controller 104(1). Consistent with the present concepts, changing the CAD blob renders the counterfeit controller 104(2) unable to authenticate.

A counterfeiter can manufacture one or more cloned controllers that have the same certificate (and thus the same AccessoryID) as the controller 104(1). However, a cloned controller would fail to successfully authenticate with the policy service 108, because the cloned controller is unable to present the latest CAD blob that the policy service 108 issued to the controller 104(1).

In Alternative 3, the policy service 108 has determined that the controller 104(1) has presented an out-of-date CAD blob that does not match the latest CAD blob stored in the authentication database 114. Therefore, the policy service 108 rejects the controller 104(1) as a counterfeit.

Accordingly, in Sequence 13, the policy service 108 informs the authentication service 106 that the controller 104(1) is rejected. For example, the policy service 108 sends an AccessoryIsRejected message to the authentication service 106. The AccessoryIsRejected message in Sequence 13 is one of the possible responses to the IsAccessoryAllowed message in Sequence 4.

In Sequence 14, the authentication service 106 relays the failure of the authentication attempt to the controller 104(1). For example, the authentication service 106 sends a GetAToken Rejected message to the controller 104(1). The GetATokenRejected message in Sequence 14 is one of the possible responses to the GetATokenRequest message in Sequence 3.

In Sequence 15, the controller 104(1) informs the console 102(1) that the attempt to authenticate and obtain a valid AToken failed. For example, the controller 104(1) sends a RequestATokenFailed message to the console 102(1). The RequestATokenFailed message in Sequence 15 is one of the possible responses to the RequestAToken message in Sequence 1. In some implementations, one or more of the AccessoryIsRejected message in Sequence 13, the GetATokenRejected message in Sequence 14, and the RequestATokenFailed message in Sequence 15 include an error code that indicates the reason for the failed authentication attempt. The completion of Sequence 15 can end an unsuccessful authentication session.

In some implementations, if the console 102(1) receives the RequestATokenFailed message from the controller 104(1) or if the controller 104(1) fails to respond to the RequestAToken message, then the console 102(1) attempts to determine whether the failed authentication is the fault of the controller 104(1) or the fault of the authentication service 106. For instance, the controller 104(1) could have failed to obtain a valid AToken because the controller 104(1) was a counterfeit that presented an outdated CAD blob or because the authentication service 106 was unavailable (e.g., unresponsive).

For example, upon receiving the RequestATokenFailed message from the controller 104(1), the console 102(1) sends a CheckServiceStatus message to the authentication service 106. If the authentication service 106 responds with a ServiceHealthy message, then the console 102(1) informs the user that the controller 104(1) is an unauthorized accessory and/or that the license is invalid.

Alternatively, if the authentication service 106 fails to respond to the CheckServiceStatus message or responds with an error message (or any other indication that the authentication service 106 and/or the policy service 108 is degraded), then the console 102(1) ignores the failed authentication attempt by the controller 104(1). In such a case, the console 102(1) allows the controller 104(1) to operate as though it were successfully authenticated until the authentication service 106 is healthy. For example, the console 102(1) can periodically (e.g., hourly, daily, etc.) retry sending the CheckServiceStatus message to the authentication service 106 until the ServiceHealthy message is received. This scheme allows the controller 104(1) to operate even if the authentication service 106 and/or the policy service 108 is experiencing an outage, temporarily offline for a scheduled maintenance, or unable to authenticate any accessory for some reason.

Processes

Figure 4:
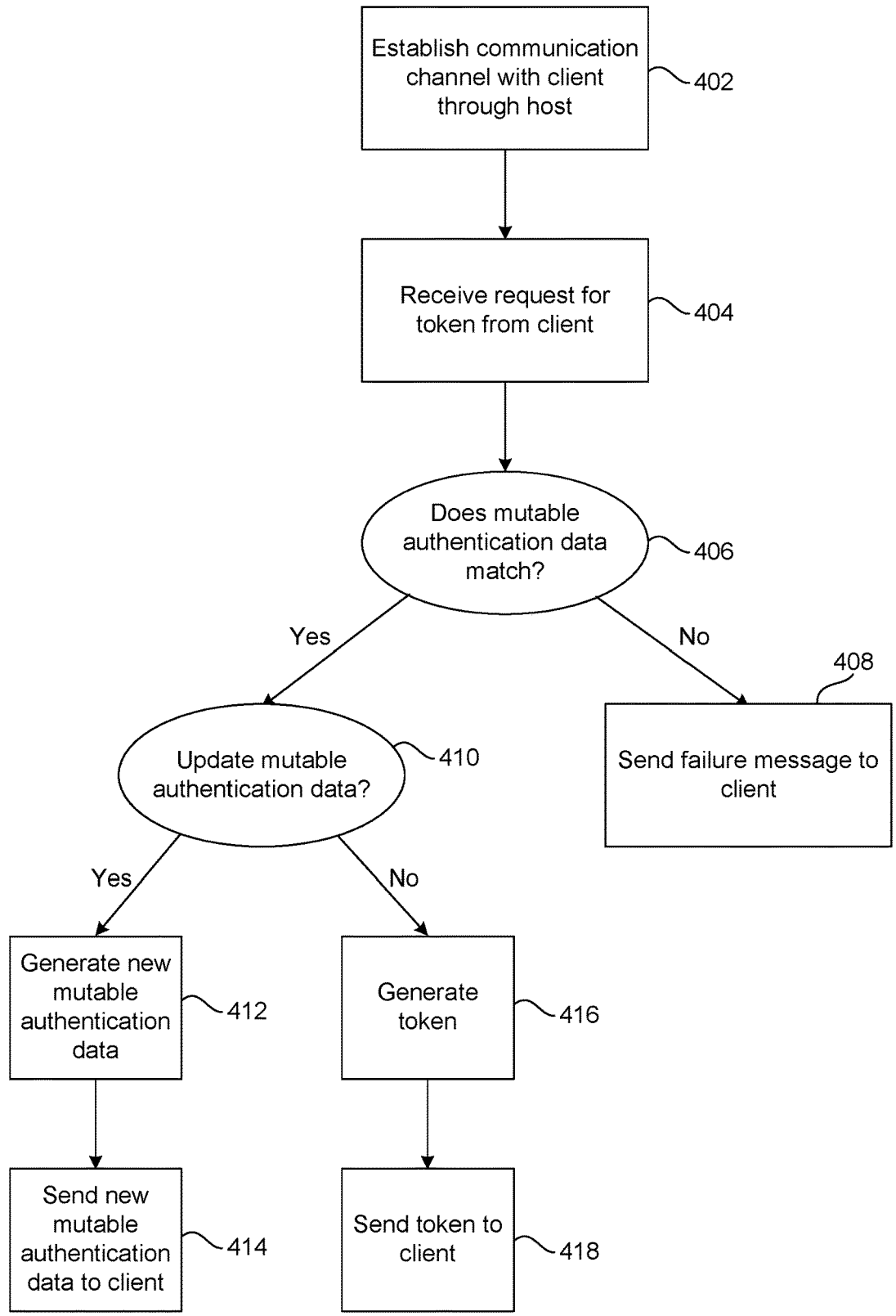
FIG. 4 illustrates a flow diagram of an example authentication server method, consistent with some implementations of the present concepts.

FIG. 4 illustrates a flow diagram of an example authentication server method 400, consistent with some implementations of the present concepts. The authentication server method 400 is presented for illustration purposes and is not meant to be exhaustive or limiting. The acts in the authentication server method 400 can be performed in the order presented, in a different order, or in parallel or simultaneously, can be omitted, can be repeated, or can include intermediary acts therebetween.

In act 402, a communication channel is established with a client through a host. In one implementation, the client initiates contact to request communication. Although the communication channel is used logically to exchange messages with the client, the communication channel is actually implemented through the host acting as a proxy that relays messages with the client. That is, messages intended to be sent to the client are actually sent to the host, which will forward the messages to the client. And, messages from the client are actually received from the host, which forwarded the messages from the client. The communication channel can be an encrypted channel. Establishing the communication channel can involve exchanging certificates. For example, a client certificate including a client identifier that is associated with the client is received.

In act 404, a request for a token is received from the client. The request is received through the communication channel established in act 402. The token serves as evidence that the client is authentic, authorized, valid, and/or licensed. Accordingly, the request for the token is a request for authentication. Consistent with the present concepts, the request includes mutable authentication data that is associated with the client. For example, the client stores the mutable authentication data and includes it in the request for the token. In one implementation, the request also includes a host identifier associated with the host.

In act 406, a determination is made as to whether the mutable authentication data that is received from the client matches mutable authentication data that is stored in association with the client identifier in an authentication database. In one implementation, the authentication database stores latest mutable authentication data issued to clients in association with client identifiers of the clients. In act 406, a lookup is performed in the authentication database using the client identifier received in act 402 to retrieve the latest mutable authentication data associated with the client. And, the retrieved latest mutable authentication data is compared with the mutable authentication data that was received in the request for the token in act 404. If the two compared mutable authentication data match, then the client is deemed authentic, but if they do not match, then the client is deemed a counterfeit.

If the two compared mutable authentication data do not match, then in act 408, a failure message is sent to the client. The failure message is sent through the communication channel established in act 402. The failure message indicates that the mutable authentication data that the client provided inside the request for the token in act 404 was not the latest mutable authentication data that was issued in association with the client identifier obtained while establishing the communication channel in act 402. The failure message is sent instead of the token that was requested in act 404. Accordingly, the client is considered a counterfeit and a valid token (which would be proof of authenticity) is not provided to the client.

If the two compared mutable authentication data match in act 406, then in act 410, a determination is made as to whether to update the mutable authentication data associated with the client. In one implementation, a policy or a set of policies are checked to determine whether the policies dictate that the existing mutable authentication data is to be replaced with new mutable authentication data. The policies can depend on one or more factors, such as the time since the last authentication attempt, the number of authentication attempts in a certain time period, the client identifier, the host identifier, the time since the existing mutable authentication data was generated, or any other factors set by the policy-setting authority.

If checking the policies determines that the existing mutable authentication is to be updated, then in act 412, new mutable authentication data is generated. The new mutable authentication data is stored in association with the client identifier in the authentication database by replacing (e.g., overwriting) the existing mutable authentication data. Accordingly, consistent with the present concepts, the next authentication attempt by the client would be successful by providing the new authentication data, not by providing the old authentication data.

In act 414, the new mutable authentication data is sent to the client. The new mutable authentication data is sent through the communication channel established in act 402. For example, a command to store the new mutable authentication data is sent to the client, and the command includes the new mutable authentication data as a payload (e.g., a parameter). After 414, the client can send another request for the token using the new mutable authentication data, in which case, the server authentication method 400 would repeat from act 404 (or from act 402).

If checking the policies determines that the existing mutable authentication is not to be updated, then in act 416, a token is generated. The token can serve as proof to the host that the client has been authenticated. In some implementations, the token is associated with the specific host so that the token does not serve as proof that the client has been authenticated to any other hosts. In one implementation, the token is signed using a private key whose corresponding public key is available to the host, such that the host can validate that the token is authentic.

In act 418, the token is sent to the client. The token is sent through the communication channel established in act 402. The issuance of the token to the client is the result of the client presenting up-to-date mutable authentication data. Therefore, the token serves as proof that the client is authentic.

Figure 5:
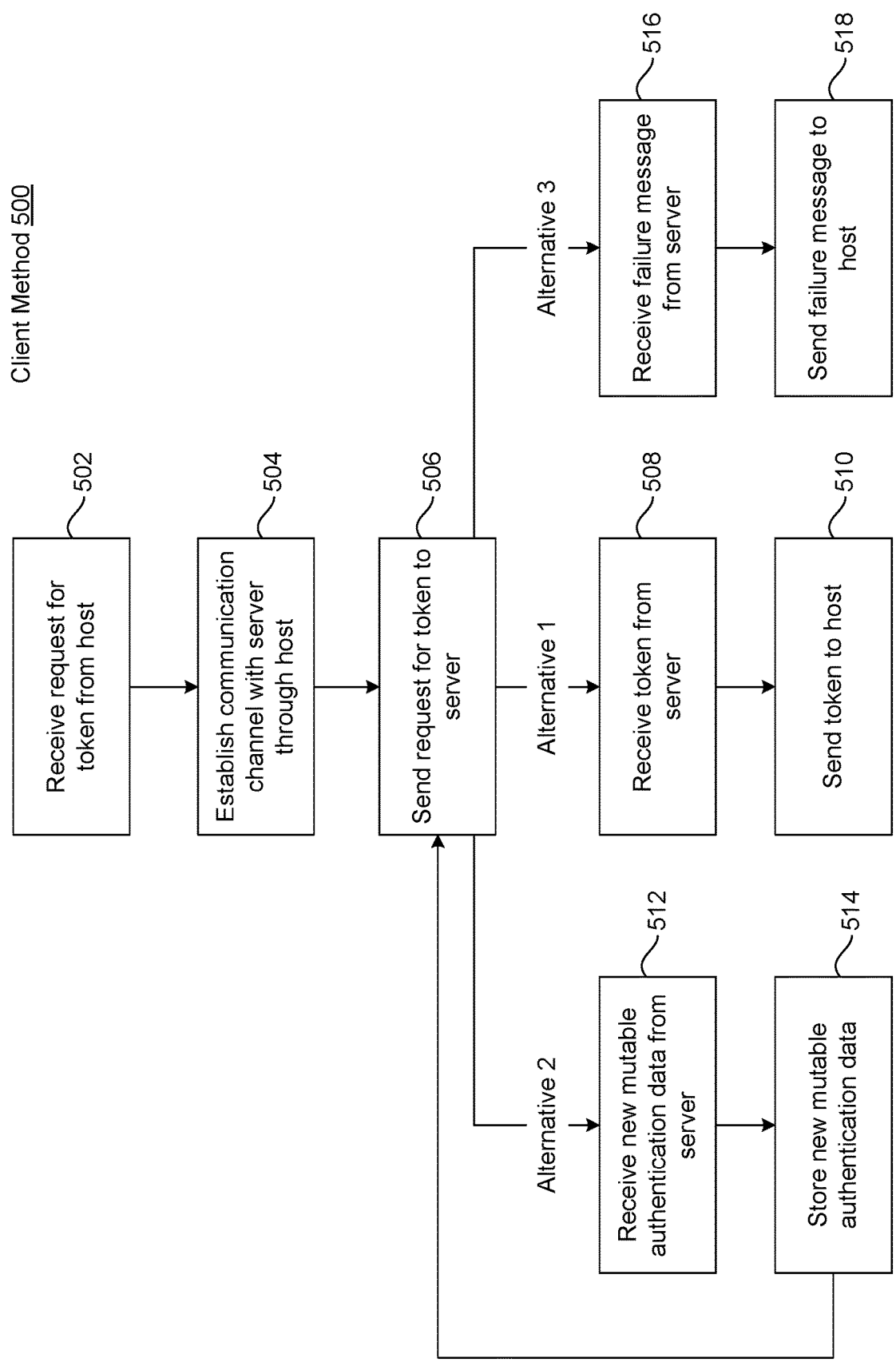
FIG. 5 illustrates a flow diagram of an example authentication client method, consistent with some implementations of the present concepts.

FIG. 5 illustrates a flow diagram of an example authentication client method 500, consistent with some implementations of the present concepts. The authentication client method 500 is presented for illustration purposes and is not meant to be exhaustive or limiting. The acts in the authentication client method 500 can be performed in the order presented, in a different order, or in parallel or simultaneously, can be omitted, can be repeated, or can include intermediary acts therebetween.

In act 502, a request for a token is received from a host. The token serves as proof of authenticity, and therefore, the host is requesting proof of authenticity. Other paradigms for proving authenticity may be used besides a token. In one implementation, the request for the token includes an identification of a server from which the token can be obtained. The identification of the server can include a hostname, an Internet Protocol (IP) address, or any other identification that can be used to contact and/or communicate with the server. The request for the token can include a host identifier of the host.

In act 504, a communication channel is established with the server through the host. In one implementation, the client initiates contact with the server to request communication. Although the communication channel is used logically to exchange messages with the server, the communication channel is actually implemented through the host acting as a proxy that relays messages with the server. That is, messages intended to be sent to the server are actually sent to the host, which will forward the messages to the server. And, messages from the server are actually received from the host, which forwarded the messages from the server. The communication channel can be an encrypted channel. Establishing the communication channel can involve exchanging certificates. For example, a client certificate including a client identifier is sent to the server.

In act 506, a request for the token is sent to the server. The request for the token is sent through the communication channel established in act 504. In one implementation, the request for the token includes one mutable authentication data. In other implementations, the request for the token includes multiple mutable authentication data. In one implementation, the request for the token in act 506 includes the host identifier that was received in act 504. The server can respond to the request for the token in one of at least three ways. The three alternatives will be described below.

In Alternative 1, the server has determined that the mutable authentication data in the request for the token in act 506 is the latest mutable authentication data, and has determined that the mutable authentication data is not to be updated. As such, in act 508, a token is received from the server. The token is received through the communication channel established in act 504.

In act 510, the token is sent to the host. That is, the token that was received from the server in act 508 is presented to the host in act 510 as proof of successful authentication. Sending the token to the host in act 510 is one of the possible responses to the request for the token received from the host in act 502.

In Alternative 2, the server has determined that the mutable authentication data in the request for the token in act 506 is the latest mutable authentication data, and has determined that the mutable authentication data is to be updated. As such, in act 512, new mutable authentication data is received from the server. The new mutable authentication data is received through the communication channel established in act 504.

In act 514, the new mutable authentication data is stored. Storing the new mutable authentication data replaces the old mutable authentication data that was sent with the request for the token to the server in act 506. Accordingly, any counterfeit device that tries to authenticate by presenting the old mutable authentication data to the server would be rejected. The new mutable authentication data is persistently stored so that it can be presented to the server during future authentication attempts.

After act 514, the client authentication method 500 returns to and repeats act 506 by sending another request for the token to the server, where the repeat request for the token includes the new mutable authentication data received in act 512. Presenting the new mutable authentication data back to the server is a technique of confirming to the server that the new mutable authentication data was successfully received (e.g., over a network) and successfully committed to memory. The client authentication method 500 can continue by repeating acts 508 and 510. Alternatively, after act 514, the client authentication method 500 returns to and repeats act 504 by establishing a new communication channel.

In Alternative 3, the server has determined that the mutable authentication data in the request for the token in act 506 is not the latest mutable authentication data and therefore rejects the request for the token. As such, in act 516, a failure message is received from the server. The failure message is received through the communication channel established in act 504. The failure message can include an error code that indicates one of several reasons for the failure. For example, if a counterfeit device sends a request for a token that includes outdated mutable authentication data, then the request for the token will be rejected.

In act 518, a failure message is sent to the host. The failure message sent to the host in act 518 is one of the possible responses to the request for the token received from the host in act 502.

Technical Advantages

The concepts described herein provide many technological advantages. For instance, authenticating an accessory through a host allows the accessory to be a relatively simple (and/or small) device. For example, the accessory need not have a cellular modem chip or a Wi-Fi chip to connect to the Internet. Instead, the accessory communicates with the host in order to indirectly communicate with an authentication server. Accordingly, the accessory can simply communicate with the host using wire, Bluetooth, infrared, near-field communication (NFC), etc. Also, the accessory can implement a relatively lean protocol with a minimal number of commands (or messages) that can run on an embedded device without having to implement a large suite of commands included in a comprehensive protocol, which would require more processing capability, more memory, more storage, more power, etc. For example, the accessory can implement a small subset of the full TLS specifications. Accordingly, the cost of the accessory can be cheaper. Moreover, because the present concepts do not require discrete security integrated circuits (ICs), the cost of manufacturing accessories is reduced.

Furthermore, the present concepts offer a software-based authentication scheme that requires less specialized hardware than previous solutions that relied on hardware security chips to combat counterfeits. Therefore, the software-based authentication schemes described herein are less susceptible to manufacturing defects, manufacturing delays, labor costs, labor shortages, supply-chain bottlenecks, weather-related catastrophes, etc. Less hardware requirements also provide the added benefit of easier modifications. That is, the present concepts that use software-based authentication techniques are more versatile, i.e., can be more easily, quickly, and cheaply modified, by changing the software, e.g., via updates and patches. For example, the authentication protocol can be updated by a software update without any hardware modifications. Moreover, the authentication protocol can be implemented on existing hardware of accessories that were not originally designed and manufactured to implement the authentication protocol.

The present concepts exploit the ease of updating software data in client devices (e.g., accessories) by issuing and frequently changing mutable authentication data stored in client devices. Although a counterfeiter could copy and install the same client certificate in multiple clones, it is extremely difficult for a counterfeiter to copy and install mutable authentication data to multiple clones. Moreover, even if a counterfeiter copied the mutable authentication data and installed it in multiple clones, because the present concepts dynamically change the mutable authentication data, the clones would not be functional. And, of course, it is virtually impossible for a counterfeiter to continue to copy every newly issued mutable authentication data into all of the multiple clones on an ongoing basis. Accordingly, the present concepts provide a cheap, versatile, and reliable authentication techniques for deterring clones.

Applications

The present concepts and the many example implementations above have been explained in the context of authenticating video game controllers as accessory devices. However, the present concepts have a much wider range of applications. The present concepts can be implemented in any client that needs to be authenticated, so long as the client can store, overwrite, and present mutable authentication data. The client can be any hardware device (e.g., a video game controller, video game console, computer, smartphone, tablet, headphones, keyboard, card, badge, car, key, switch, watch, camera, storage device, remote control, appliance, integrated circuit, wearable, etc.) or any software module (e.g., application, program, game, file, service, operating system, driver, etc.). The host can be any hardware device or any software module that can facilitate communication between the client and the server. For example, the host can be a video game console, computer, car, door, switch, elevator, or any hardware or software that can enable, disable, accept, reject, detect, use, or interact with the client.

EXAMPLES

Various examples are described above. Additional examples are described below. One example includes a system comprising a storage including first mutable authentication data and a processor for executing instructions that cause the processor to: receive a first request for a token from a host, establish a communication channel with a server through the host, send a second request for the token to the server, the second request including the first mutable authentication data, receive the token from the server, and send the token to the host.

Another example can include any of the above and/or below examples where the instructions further cause the processor to receive second mutable authentication data from the server.

Another example can include any of the above and/or below examples where the instructions further cause the processor to store the second mutable authentication data in the storage.

Another example can include any of the above and/or below examples where storing the second mutable authentication data in the storage replaces the first mutable authentication data in the storage.

Another example can include any of the above and/or below examples where the instructions further cause the processor to send a third request for the token to the server, the third request including the second mutable authentication data.

Another example can include any of the above and/or below examples where the second request includes an identifier of the host and the token is valid for the host but not valid for other hosts.

Another example can include any of the above and/or below examples where the second request is sent and the token is received through the communication channel.

Another example includes a computer-readable storage medium including instructions which, when executed by a processor, cause the processor to: receive a first request for a token from a host, establish a communication channel with a server through the host, send, through the communication channel, a second request for the token to the server, the second request including first mutable authentication data, receive, through the communication channel, the token from the server, and send the token to the host in response to the first request.

Another example can include any of the above and/or below examples where the instructions further cause the processor to receive, through the communication channel, second mutable authentication data from the server, the second mutable authentication data being different from the first mutable authentication data.

Another example can include any of the above and/or below examples where the instructions further cause the processor to store the second mutable authentication data by replacing the first mutable authentication data.

Another example can include any of the above and/or below examples where the instructions further cause the processor to send, through the communication channel, a third request for the token to the server, the third request including the second mutable authentication data.

Another example can include any of the above and/or below examples where the first request includes a host identifier of the host and the second request includes the host identifier.

Another example includes a computer-implemented method, comprising establishing a communication channel with a client through a host, receiving a first request for a token from the client, the first request including first mutable authentication data, determining whether the first mutable authentication data matches second mutable authentication data, in response to determining that the first mutable authentication data matches the second mutable authentication data, determining whether to update the second mutable authentication data, in response to determining to update the second mutable authentication data, generating third mutable authentication data, and sending the third mutable authentication data to the client.

Another example can include any of the above and/or below examples where the method further comprises checking one or more policies to determine whether to update the second mutable authentication data.

Another example can include any of the above and/or below examples where the method further comprises in response to determining not to update the second mutable authentication data, generating the token and sending the token to the client.

Another example can include any of the above and/or below examples where the method further comprises in response to determining that the first mutable authentication data does not match the second mutable authentication data, sending a failure message to the client.

Another example can include any of the above and/or below examples where the method further comprises storing the third mutable authentication data.

Another example can include any of the above and/or below examples where the method further comprises replacing the second mutable authentication data with the third mutable authentication data.

Another example can include any of the above and/or below examples where the first request is received and the third mutable authentication data is sent through the communication channel.

Another example can include any of the above and/or below examples where the method further comprises receiving a second request to validate the token from the host and sending a message that validates the token to the host.

The invention claimed is:

1. A system, comprising:
storage including first mutable authentication data; and
a processor configured by one or more instructions that cause the processor to:
    receive a first request for a token from a host;
    establish a communication channel with a server through the host;
    send a second request for the token to the server, the second request including the first mutable authentication data stored in the storage, the first mutable authentication data stored in the storage being valid while the server stores the first mutable authentication data and until the server replaces the first mutable authentication data stored in the server with second mutable authentication data;
    receive the token from the server; and
    send the token to the host.

2. The system of claim 1, wherein the instructions further cause the processor to:
receive the second mutable authentication data from the server.

3. The system of claim 2, wherein the instructions further cause the processor to:
store the second mutable authentication data in the storage.

4. The system of claim 3, wherein storing the second mutable authentication data in the storage replaces the first mutable authentication data in the storage.

5. The system of claim 2, wherein the instructions further cause the processor to:
send a third request for the token to the server, the third request including the second mutable authentication data.

6. The system of claim 1, wherein:
the second request includes an identifier of the host; and
the token is valid for the host but not valid for other hosts.

7. The system of claim 1, wherein the second request is sent and the token is received through the communication channel.

8. A computer-implemented method comprising:
receiving a first request for a token from a host;
establishing a communication channel with a server through the host;
sending, through the communication channel, a second request for the token to the server, the second request including first mutable authentication data retrieved from storage, the first mutable authentication data being valid while the server stores the first mutable authentication data and until the server replaces the first mutable authentication data stored in the server with second mutable authentication data;
receiving, through the communication channel, the token from the server; and
sending the token to the host in response to the first request.

9. The computer-implemented method of claim 8, further comprising:
receiving, through the communication channel, the second mutable authentication data from the server, the second mutable authentication data being different from the first mutable authentication data.

10. The computer-implemented method of claim 9, further comprising:
storing the second mutable authentication data by replacing the first mutable authentication data.

11. The computer-implemented method of claim 10, further comprising:
sending, through the communication channel, a third request for the token to the server, the third request including the second mutable authentication data.

12. The computer-implemented method of claim 8, wherein:
the first request includes a host identifier of the host; and
the second request includes the host identifier.

13. A video game controller comprising:
a processor; and
storage having instructions which, when executed by the processor, cause the video game controller to:
receive a first request for a token from a video game console;
establish a communication channel with a server through the video game console;
retrieve first mutable authentication data from the storage;
send a second request for the token to the server, the second request including the first mutable authentication data retrieved from the storage, the first mutable authentication data being valid while the server stores the first mutable authentication data and until the server replaces the first mutable authentication data stored in the server with second mutable authentication data;
receive the token from the server; and
send the token to the video game console.

14. The video game controller of claim 13, wherein the instructions, when executed by the processor, cause the video game controller to:
establish the communication channel as an encrypted communication channel that tunnels through the video game console to the server.

15. The video game controller of claim 14, wherein the second request is sent from the video game controller to the server by tunneling through the video game console via the encrypted communication channel.

16. The video game controller of claim 15, wherein the token is received from the server by tunneling through the video game console via the encrypted communication channel.

17. The video game controller of claim 16, the encrypted communication channel comprising a transport layer security connection.

18. The video game controller of claim 13, wherein the instructions, when executed by the processor, cause the video game controller to:
receive the second mutable authentication data from the server; and
replace the first mutable authentication data in storage with the second mutable authentication data.

19. The video game controller of claim 18, wherein the instructions, when executed by the processor, cause the video game controller to:
after replacing the first mutable authentication data with the second mutable authentication data, send a third request to the server, the third request including the second mutable authentication data;
receive a second token from the server in response to the third request; and
send the second token to the video game console.

20. The video game controller of claim 19, wherein the first mutable authentication data and the second mutable authentication data expire after specified time period.

* * * * *